(12) United States Patent
Fries et al.

(10) Patent No.: US 6,929,313 B2
(45) Date of Patent: Aug. 16, 2005

(54) PLASTIC FENDER FOR A MOTOR VEHICLE AND DEVICE FOR FASTENING THE SAME

(75) Inventors: Bernd Fries, deceased, late of Weissenburg (DE); by Gudrun Fries, legal representative, Weissenburg (DE); Joachim Wehner, Brannenburg (DE)

(73) Assignees: Bayerische Motoren Werke Aktiengesellschaft, Munich (DE); Dynamit Nobel Kunststoff GmbH, Weissenburg (DE)

( * ) Notice: Subject to any disclaimer, the term of this patent is extended or adjusted under 35 U.S.C. 154(b) by 0 days.

(21) Appl. No.: 10/946,624

(22) Filed: Sep. 22, 2004

(65) Prior Publication Data

US 2005/0099035 A1   May 12, 2005

Related U.S. Application Data

(63) Continuation of application No. PCT/EP03/02338, filed on Mar. 7, 2003.

(30) Foreign Application Priority Data

Mar. 23, 2002  (DE) ............................... 102 13 168

(51) Int. Cl.$^7$ ............................................. B60R 27/00
(52) U.S. Cl. ................... 296/193.05; 296/198
(58) Field of Search ............................ 296/29, 187.12, 296/191, 193.05, 198; 280/770; 24/297

(56) References Cited

U.S. PATENT DOCUMENTS 3,093,392 A  *  6/1963  Barenyi ...................... 296/198
4,973,102 A     11/1990  Bien
5,098,765 A  *  3/1992  Bien ........................... 296/198
5,271,658 A     12/1993  Haldenwanger et al.
6,394,537 B1    5/2002  DeRees
6,409,255 B2 *  6/2002  Tilsner et al. ............... 296/198

FOREIGN PATENT DOCUMENTS

| DE | 19534389 A1 | 3/1997 |
| DE | 19608548 A1 | 9/1997 |
| DE | 69702324 T2 | 1/2001 |
| DE | 10203829 A1 | 8/2002 |
| EP | 0523052 B1  | 4/1994 |
| FR | 2756599 A1  | 6/1998 |
| FR | 2784955 A1  | 4/2000 |
| WO | WO 0048895  | 8/2000 |

* cited by examiner

Primary Examiner—Lori L. Coletta
(74) Attorney, Agent, or Firm—Crowell & Moring LLP

(57) ABSTRACT

A plastic fender has an upper first edge area and a second edge area extending at an approximately 90° angle thereto. The fender is fixed to the vehicle body in the second edge area by a screw. Furthermore, along the first and second edge areas, a plurality of spaced-apart elongated holes is provided, which admit a mounting section of a guide element which in turn is mounted to the vehicle body with a mounting screw. On the mounting sections of the guide elements, a guide edge covering, respectively, the opposite longitudinal edges of an elongated hole is provided such that, during thermal expansion, the fender can elongate unhindered. For this purpose, the longitudinal extent of the mounting section of the guide elements is shorter than the corresponding longitudinal extent of the elongated hole.

30 Claims, 2 Drawing Sheets

PLASTIC FENDER FOR A MOTOR VEHICLE AND DEVICE FOR FASTENING THE SAME

This is a continuation of International Application PCT/EP03/02338 with an international filing date of Mar. 7, 2003, the disclosure of which is incorporated by reference herein.

This application also claims the priority of prior application 102 13 168.6, filed in Germany on Mar. 23, 2002.

BACKGROUND AND SUMMARY OF THE INVENTION

The present invention relates to a plastic fender of a motor vehicle, having a plurality of spaced-apart elongated holes extending longitudinally in thermal expansion directions of the fender along a first edge area on a hood side and along a second edge area on a support column side which extends at an angle thereto for admitting a holding element which in turn is fixed to a vehicle body, and as disclosed in European publication EP 0 523 052 B1, on page 2, lines 9 to 28.

Since a plastic fender elongates under the action of high heat, the plastic fender described on page 2 of this European publication is rigidly fixed at its edge area on the support column side, while its edge area on the hood side has a plurality of spaced-apart elongated holes for admitting mounting screws. In case of thermal expansion, the plastic fender can shift along the elongated holes on the hood side while its edge area on the support column side is rigidly fixed. This has a drawback in that, during painting of the vehicle, the process temperatures of approximately 200° C. can cause a plastic fender mounted to the body to bulge along its rigid edge area and to deform permanently under some circumstances.

An object of the invention is thus to mount a plastic fender to a vehicle body such that bulging of the fender during thermal expansion is prevented along all the edge areas.

This object is attained by having the fender fixedly mounted to the vehicle body in a corner region between a first edge area and a second edge area, and by having the mounting sections of guide elements, which in turn are fixedly mounted to the vehicle body, engage in the elongated holes, such that, during thermal expansion, the fender longitudinally shifts relative to the guide elements.

Since the inventive plastic fender is screwed down only in the corner region between the first and the second edge areas, it can shift during thermal expansion—whether caused by atmospheric exposure or during painting of the vehicle—along the edge area on both the hood side and the support column side, such that the plastic fender cannot bulge or otherwise deform. Since a rectangular mounting section of a guide element, which in turn is fixed to the vehicle body, engages in the elongated holes that are provided along the two edge areas of the plastic fender and is shorter than the corresponding longitudinal extent of the elongated hole, the plastic fender is guided exactly and unhindered in both longitudinal directions. Both the elongated holes and the guide elements can be provided very cost effectively. The guide elements are made of metal or plastic and have little weight.

The plastic fender, near the reference point formed by a screw, is held by a body-mounted screw with locating bushing in a through-hole with radial play, which is provided in the first edge area. This ensures that the plastic fender can slightly shift in relation to the reference point. The locating bushing, or instead thereof a correspondingly configured screw head, does not interfere with a hinge or similar fixture located in this area.

Because the plastic fender elongates more strongly in the area of its two free ends than in the area of the through-hole or the reference point, while the guide elements, on the other hand, are fixed to the vehicle body, the elongated holes have a steadily increasing longitudinal extent toward the area of the free ends of the fender. In other words, the length of the mounting section of a guide element remains constant, e.g., at 20 mm, but the length of an elongated hole near the through-hole measures, e.g., 30 mm, and the length of an elongated hole near the free end of the fender approximately 45 mm. Thus, the plastic fender can elongate unhindered, but for strength reasons, the elongated holes near the through-hole or the reference point do not have the same longitudinal extent as the elongated holes at the free ends of the fender.

To enable the guide elements to be detachably mounted to the vehicle body they are provided with a mounting section that is rectangular in top view. The width of the mounting section is smaller than the width of the elongated hole, such that the plastic fender can shift longitudinally unhindered, irrespective of thermal expansion or production and assembly tolerances. The mounting section can be mounted to the vehicle body in a simple manner using a screw that goes all the way through or—if made of plastic—using a one-piece screw shank.

To ensure that the plastic fender is always precisely guided as it shifts in longitudinal direction because of thermal expansion, a guide edge protrudes from each of the two long sides of the rectangular mounting section of the guide elements and covers the longitudinal edge of an elongated hole facing it while leaving an air gap. A bevel provided at each end face of the guide edges, which is approximately 1.5 to 2 mm wide and extends at an approximately 20° angle to the end face, further ensures that the plastic fender shifts perfectly in longitudinal direction. Finally, at the two end faces of the mounting section, in the corner regions thereof, an approximately 2 mm wide bevel is formed, which likewise extends at an approximately 20° angle to the end face of the mounting section.

In accordance with one feature of the invention, contact surfaces are provided at the bottom in the area of the two end faces of the mounting section to ensure that the mounting section presses slightly into the surface of the vehicle body during tightening so as to be secured against rotation.

An embodiment of the invention will now be described in greater detail, by way of example, with reference to the drawings.

DETAILED DESCRIPTION OF THE INVENTION

Figure 1:
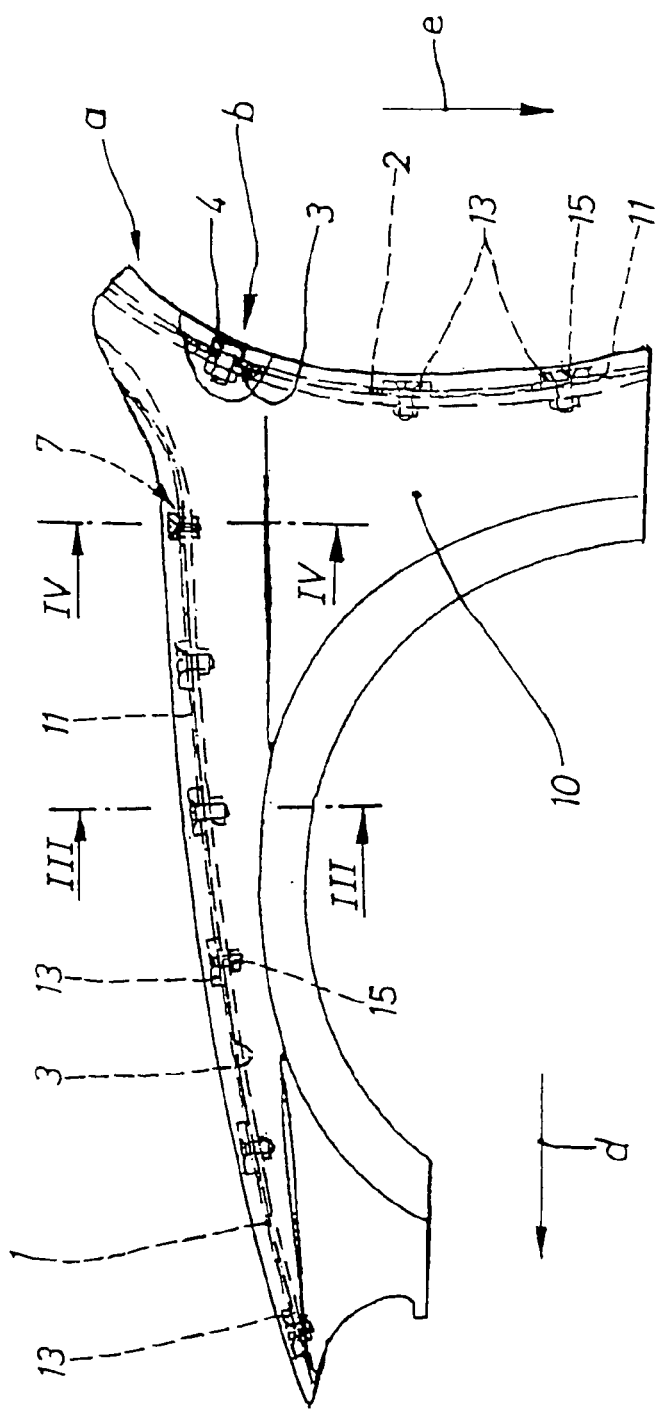
FIG. 1 is a front view of a plastic fender of a passenger car.
Figure 2:
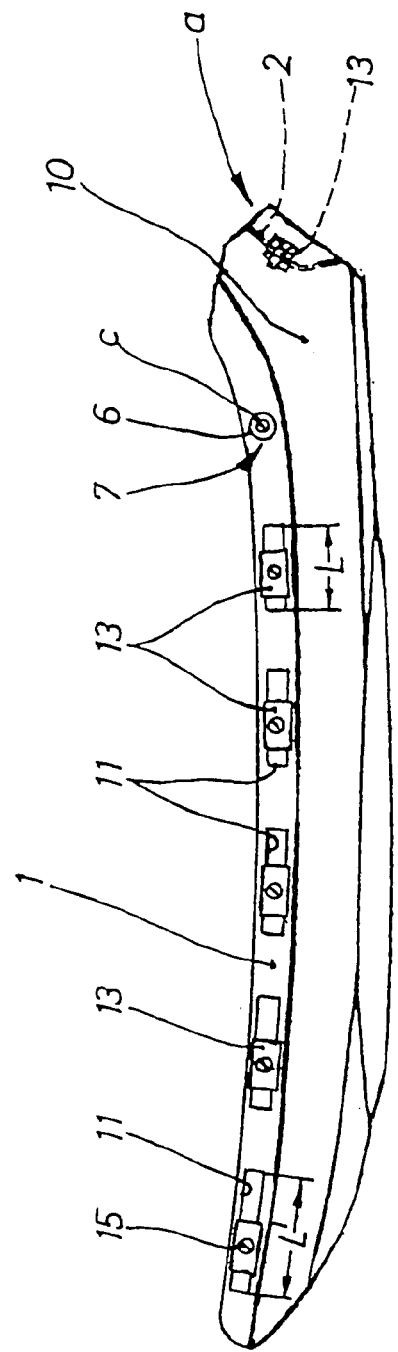
FIG. 2 is a top view of the fender shown in FIG. 1.
Figure 4:
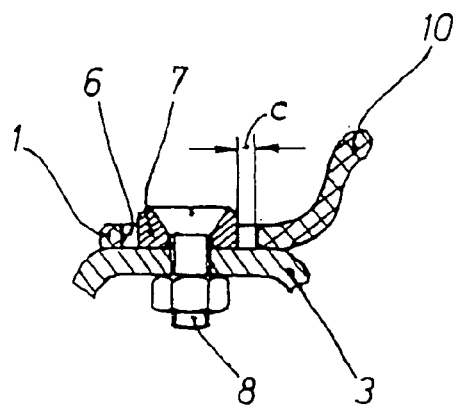
FIG. 4 is an enlarged cross section taken along line IV—IV in FIG. 1.

The thermoplastic fender 10 depicted in FIGS. 1 and 2 is located on the front left of a passenger car as seen in driving direction and is manufactured as a one-piece plastic component using an injection molding process. The fender 10 has a first edge area 1 and a second edge area 2 extending at an approximately 90° angle thereto. In this second edge area 2 and the first edge area 1, the fender 10 is detachably fixed to the vehicle body 3. The first edge area 1 faces the front hood (not depicted) in its closed position, while the second edge area 2 is located in the region of the front support column (A column) and the passenger door of the car (not depicted). As may be seen in FIG. 1, the fender 10 is screwed to the vehicle body 3 in the second edge area 2 near the corner region (a) with a screw 4, such that a reference point (b) is formed. In the first edge area 1 of the fender 10, near its corner region (a), a through-hole 6 is provided, which surrounds a locating bushing 7 with radial play (c). The locating bushing is fixed to the vehicle body 3 by a screw 8 (FIG. 4).

As FIGS. 1 and 2 further show, five spaced-apart elongated holes 11 are arranged along the first edge area 1 of the fender 10 and two likewise spaced-apart elongated holes 11 are provided along the second edge area 2. They each extend in thermal expansion direction of the fender 10, which is indicated by the directions of the arrows (d) and (e) relative to the reference point (b). In each of the elongated holes 11 provided in the first and second edge areas 1 and 2 there is a rectangular mounting section 12 of a plastic or metal guide element 13, which is shown in detail in FIG. 5. To enable the fender 10, which in FIGS. 1 and 2 is depicted at room temperature (approximately 20° C.), to shift longitudinally unhindered during thermal expansion, the width of the mounting section 12 is slightly smaller than the width of the elongated holes 11. Furthermore, the guide elements 13 each have a through-hole 14 in the center area of their longitudinal extent to admit a mounting screw 15, which in turn is fixed to the vehicle body 3 and is used to mount the guide elements 13 to the vehicle body 3 (FIG. 3).

Figure 3:
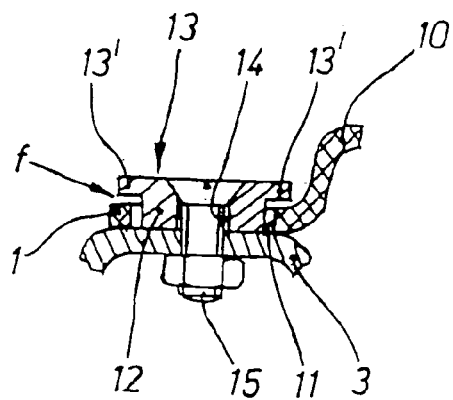
FIG. 3 is an enlarged cross section taken along line III—III in FIG. 1.
Figure 5:
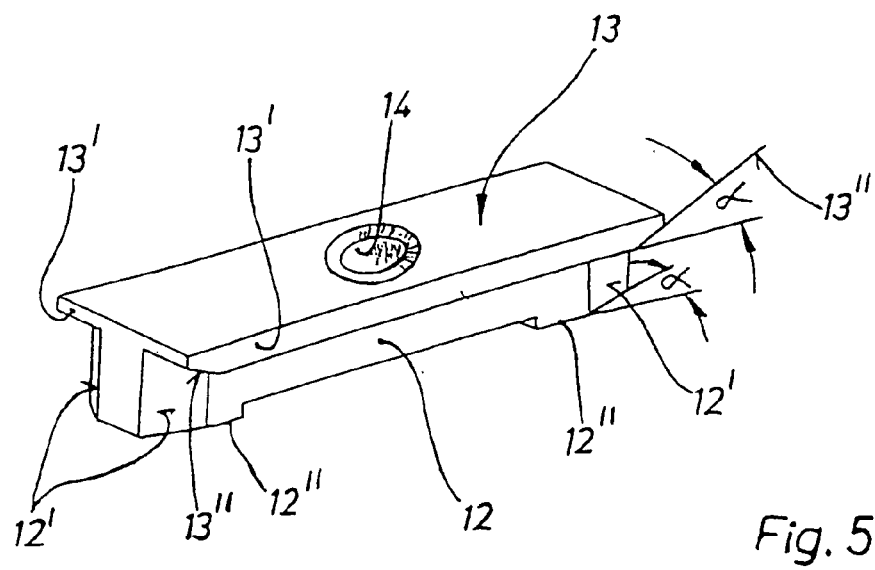
FIG. 5 is a perspective view of a guide element.

From FIGS. 3 and 5 it may further be seen that a guide edge 13' laterally protrudes from the two long sides of the rectangular mounting section 12 of the guide element 13, such that the two guide edges 13', respectively, cover the opposite longitudinal edges of the elongated hole 11. Between the inside of the guide edges 13' and the surface of the fender 10 facing it, there is an air gap (f) to ensure that during thermal expansion the fender 10 can always shift unhindered in the direction of the arrows (d) and (e) relative to the body-mounted guide elements 13. During thermal expansion, the first and second edge areas 1 and 2 elongate increasingly over the full longitudinal extent compared to the area of the reference point (b). Consequently, the longitudinal extent of the elongated holes 11 from the through-hole 6 or the reference point (b) up to the free end of the first and second edge areas 1 and 2 continues to increase slightly, in contrast to the longitudinal extent of the mounting section 12 of the guide element 13, which has always the same size. For example, the mounting section 12 measures 20 mm in length. The length L of the elongated hole adjacent to the through-hole 6 measures approximately 30 mm, whereas the length L' of the elongated hole located at the free end of the first edge area 1 measures approximately 45 mm.

Figure 6:
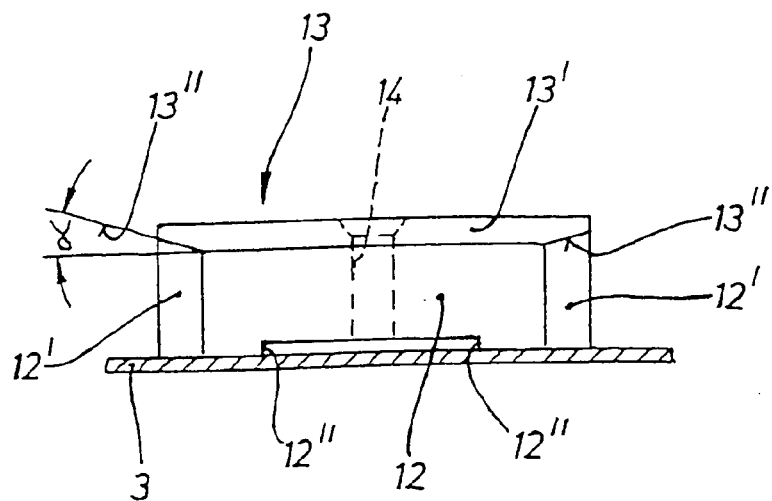
FIG. 6 is a front view of the guide element.

As shown in FIGS. 5 and 6, the mounting section 12 of the guide element 13 has a bevel 12' at each of its two end faces, which is approximately 1.5 to 2 mm wide and extends at an approximately 20° angle a relative to the end face of the mounting section 12. In addition, the two guide edges 13' of the guide element 13 have a bevel 13" at each of their two end faces which is approximately 2 mm wide and extends at an approximately 20° angle α relative to an end face of the guide edge 13'. Finally, the mounting section 12 at each of its two end faces has a contact surface 12" on the bottom, which slightly presses into the surface of the first and the second edge areas 1 and 2 after the mounting screw 15 has been tightened, such that a rotation of the guide element 13 about the fastening screw 15 is prevented.

What is claimed is:

1. A plastic fender of a motor vehicle having a plurality of spaced-apart elongated holes extending longitudinally in thermal expansion directions of the fender along a first edge area on a hood side and along a second edge area on a support column side which extends at an angle thereto for admitting a holding element which in turn is fixed to a vehicle body, wherein the fender is fixedly mounted to the vehicle body in a corner region between the first edge area and the second edge area, and wherein the mounting sections of guide elements, which in turn are fixedly mounted to the vehicle body, engage in the elongated holes such that, during thermal expansion, the fender longitudinally shifts relative to the guide elements.

2. The fender as claimed in claim 1, wherein the fender is fixedly mounted to the vehicle body by a screw near the corner region in the second edge area, thereby forming a reference point.

3. The fender as claimed in claim 2, wherein the fender has a through-hole in its first edge area near the corner region which surrounds either a locating bushing or a correspondingly configured screw head with radial play, which in turn is screwed to the vehicle body.

4. The fender as claimed in claim 3, wherein a longitudinal extent of the elongated holes provided along at least one of the first and second edge areas of the fender continuously increases slightly from the through-hole or from the reference point to a respective free end section of the first edge area or the second edge area.

5. The fender as claimed in claim 1, wherein the mounting sections of the guide elements have rectangular contours such that the longitudinal extent of each mounting section, which is always the same, is shorter than the longitudinal extent of the shortest elongated holes.

6. The fender as claimed in claim 1, wherein the width of the mounting sections of the guide elements is smaller than the width of the elongated holes.

7. The fender as claimed in claim 1, wherein the mounting sections are rectangular mounting sections, and wherein guide edges covering respectively opposite longitudinal edges of the elongated holes protrude from long sides of the rectangular mounting sections such that air gaps are provided between insides of the guide edges and surfaces of the fender.

8. The fender as claimed in claim 7, wherein, at end faces of the mounting sections, in corner regions, bevels extend at approximately 20° angles to the end faces of the mounting sections, and wherein, at the guide edges, bevels extend likewise at approximately 20° angles to end faces of the guide edges.

9. The fender as claimed in claim 8, wherein the mounting sections of the guide elements have contact surfaces protruding on the bottom in the area of each of the end faces of the mounting sections.

10. The fender as claimed in claim 1, wherein the mounting sections of the guide elements have through-holes which admit mounting screws which, in turn, are fixed to the vehicle body.

11. The fender as claimed in claim 2, wherein the mounting sections of the guide elements have rectangular contours such that the longitudinal extent of each mounting section, which is always the same, is shorter than the longitudinal extent of the shortest elongated hole.

12. The fender as claimed in claim 3, wherein the mounting sections of the guide elements have rectangular contours such that the longitudinal extent of each mounting section, which is always the same, is shorter than the longitudinal extent of the shortest elongated hole.

13. The fender as claimed in claim 4, wherein the mounting sections of the guide elements have rectangular contours such that the longitudinal extent of each mounting section, which is always the same, is shorter than the longitudinal extent of the shortest elongated hole.

14. The fender as claimed in claim 2, wherein the width of the mounting sections of the guide elements is smaller than the width of the elongated holes.

15. The fender as claimed in claim 3, wherein the width of the mounting sections of the guide elements is smaller than the width of the elongated holes.

16. The fender as claimed in claim 4, wherein the width of the mounting sections of the guide elements is smaller than the width of the elongated holes.

17. The fender as claimed in claim 5, wherein the width of the mounting sections of the guide elements is smaller than the width of the elongated holes.

18. The fender as claimed in claim 2, wherein the mounting sections are rectangular mounting sections, and wherein guide edges covering respectively opposite longitudinal edges of the elongated holes protrude from long sides of the rectangular mounting sections such that air gaps are provided between insides of the guide edges and surfaces of the fender.

19. The fender as claimed in claim 3, wherein the mounting sections are rectangular mounting sections, and wherein guide edges covering respectively opposite longitudinal edges of the elongated holes protrude from long sides of the rectangular mounting sections such that air gaps are provided between insides of the guide edges and surfaces of the fender.

20. The fender as claimed in claim 4, wherein the mounting sections are rectangular mounting sections, and wherein guide edges covering respectively opposite longitudinal edges of the elongated holes protrude from long sides of the rectangular mounting sections such that air gaps are provided between insides of the guide edges and surfaces of the fender.

21. The fender as claimed in claim 5, wherein the mounting sections are rectangular mounting sections, and wherein guide edges covering respectively opposite longitudinal edges of the elongated holes protrude from long sides of the rectangular mounting sections such that air gaps are provided between insides of the guide edges and surfaces of the fender.

22. The fender as claimed in claim 6, wherein the mounting sections are rectangular mounting sections, and wherein guide edges covering respectively opposite longitudinal edges of the elongated holes protrude from long sides of the rectangular mounting sections such that air gaps are provided between insides of the guide edges and surfaces of the fender.

23. The fender as claimed in claim 2, wherein the mounting sections of the guide elements have through-holes which admit mounting screws which, in turn, are fixed to the vehicle body.

24. The fender as claimed in claim 3, wherein the mounting sections of the guide elements have through-holes which admit mounting screws which, in turn, are fixed to the vehicle body.

25. The fender as claimed in claim 4, wherein the mounting sections of the guide elements have through-holes which admit mounting screws which, in turn, are fixed to the vehicle body.

26. The fender as claimed in claim 5, wherein the mounting sections of the guide elements have through-holes which admit mounting screws which, in turn, are fixed to the vehicle body.

27. The fender as claimed in claim 6, wherein the mounting sections of the guide elements have through-holes which admit mounting screws which, in turn, are fixed to the vehicle body.

28. The fender as claimed in claim 7, wherein the mounting sections of the guide elements have through-holes which admit mounting screws which, in turn, are fixed to the vehicle body.

29. The fender as claimed in claim 8, wherein the mounting sections of the guide elements have through-holes which admit mounting screws which, in turn, are fixed to the vehicle body.

30. The fender as claimed in claim 9, wherein the mounting sections of the guide elements have through-holes which admit mounting screws which, in turn, are fixed to the vehicle body.

* * * * *